United States Patent
Slensker et al.

(10) Patent No.: US 11,610,457 B2
(45) Date of Patent: Mar. 21, 2023

(54) DETECTING UNAUTHORIZED ACTIVITY RELATED TO A COMPUTER PERIPHERAL DEVICE BY MONITORING VOLTAGE OF THE PERIPHERAL DEVICE

(71) Applicant: Bank of America Corporation, Charlotte, NC (US)

(72) Inventors: Neal Aaron Slensker, Fort Mill, SC (US); Andrea J. Coleman, Sachse, TX (US)

(73) Assignee: Bank of America Corporation, Charlotte, NC (US)

( * ) Notice: Subject to any disclaimer, the term of this patent is extended or adjusted under 35 U.S.C. 154(b) by 227 days.

(21) Appl. No.: 17/088,163

(22) Filed: Nov. 3, 2020

(65) Prior Publication Data

US 2022/0139175 A1    May 5, 2022

(51) Int. Cl.
*G07F 19/00* (2006.01)
*G06F 21/75* (2013.01)

(52) U.S. Cl.
CPC .......... *G07F 19/209* (2013.01); *G06F 21/755* (2017.08); *G07F 19/207* (2013.01)

(58) Field of Classification Search
CPC .... G07F 19/20; G07F 19/201; G07F 19/2055; G07F 19/207; G07F 19/209
USPC ........................................................ 235/379
See application file for complete search history.

(56) References Cited

U.S. PATENT DOCUMENTS

| | | | |
|---|---|---|---|
| 5,220,501 A | 6/1993 | Lawlor et al. | |
| 5,937,092 A | 8/1999 | Wootton et al. | |
| 7,583,290 B2 | 9/2009 | Enright et al. | |
| 7,942,315 B2 | 5/2011 | He et al. | |
| 7,995,791 B2 | 8/2011 | Flook et al. | |
| 8,474,704 B1 | 7/2013 | Grimm et al. | |
| 8,584,947 B2 | 11/2013 | Mitchell | |

(Continued)

FOREIGN PATENT DOCUMENTS

| CN | 201163428 Y | * 12/2008 |
|---|---|---|
| CN | 101344980 B | 1/2011 |

(Continued)

OTHER PUBLICATIONS

Machine translation of CN 201163428, European Patent Office, retrieved Aug. 12, 2022 (Year: 2022).*

(Continued)

*Primary Examiner* — Suezu Ellis

(57) ABSTRACT

A system includes a motherboard configured to hold electronic devices and allow communication between one or more of the electronic devices, a power supply module configured to supply power to the one or more electronic devices, a peripheral device communicatively coupled to the motherboard using a peripheral port of the motherboard to perform at least one action related to an Automated Teller Machine (ATM), and a monitoring device communicatively coupled to the motherboard. The monitoring device is configured to monitor a voltage associated with the peripheral device and detect when the monitored voltage does not match an expected voltage associated with the peripheral device. In response to the detecting, the monitoring device determines that an unauthorized activity associated with the peripheral device has occurred.

17 Claims, 3 Drawing Sheets

(56) References Cited

U.S. PATENT DOCUMENTS

| | | |
|---|---|---|
| 8,944,317 B2 | 2/2015 | Lewis et al. |
| 9,070,233 B2 | 6/2015 | Dowling et al. |
| 9,147,324 B2 | 9/2015 | Lin et al. |
| 9,342,717 B2 | 5/2016 | Claessen |
| 9,405,913 B2 | 8/2016 | Krummel |
| 9,734,673 B2 | 8/2017 | Priesterjahn et al. |
| 10,049,315 B2 | 8/2018 | Chatterton et al. |
| 10,104,098 B2 | 10/2018 | Baxley et al. |
| 10,332,360 B2 | 6/2019 | Ghafoor |
| 10,496,914 B2 | 12/2019 | Scaife et al. |
| 10,572,698 B1 | 2/2020 | Keener |
| 2006/0118624 A1 | 6/2006 | Kelso et al. |
| 2009/0181750 A1* | 7/2009 | Nagano ............... G07F 17/3202 463/20 |
| 2009/0201372 A1 | 8/2009 | O'Doherty et al. |
| 2017/0061167 A1 | 3/2017 | McNicoll |
| 2018/0046948 A1 | 2/2018 | Ray et al. |
| 2020/0051362 A1 | 2/2020 | MacKinnon et al. |
| 2020/0065823 A1 | 2/2020 | Joao |
| 2022/0076543 A1* | 3/2022 | Traynor ............... G07F 19/2055 |

FOREIGN PATENT DOCUMENTS

| | | | |
|---|---|---|---|
| CN | 102859565 A | | 1/2013 |
| CN | 104980646 B | | 5/2018 |
| DE | 20102477 U1 | | 5/2001 |
| DE | 20318489 U1 | | 2/2004 |
| DE | 102004035224 A1 | | 2/2006 |
| DE | 102009018320 A1 | | 10/2010 |
| EP | 2199966 A1 | | 6/2010 |
| EP | 2455925 B1 | | 10/2011 |
| EP | 2736026 A1 | | 11/2012 |
| EP | 2897112 A1 | | 1/2014 |
| EP | 2329456 B1 | | 10/2018 |
| GB | 2351585 A | | 1/2001 |
| JP | 4460782 B2 | | 5/2010 |
| JP | 2010102545 A | | 5/2010 |
| JP | 4580168 B2 | | 11/2010 |
| JP | 4961158 B2 | | 6/2012 |
| JP | 5022661 B2 | | 9/2012 |
| JP | 5325645 B2 | | 10/2013 |
| KR | 20090015688 A | | 2/2009 |
| KR | 101658006 B1 | | 9/2010 |
| RS | 20050717 A | * | 6/2008 |
| WO | WO-2010123471 A1 | * | 10/2010 ......... G07D 11/0042 |

OTHER PUBLICATIONS

Machine translation of RS 20050717, European Patent Office, retrieved Aug. 13, 2022 (Year: 2022).*

* cited by examiner

DETECTING UNAUTHORIZED ACTIVITY RELATED TO A COMPUTER PERIPHERAL DEVICE BY MONITORING VOLTAGE OF THE PERIPHERAL DEVICE

TECHNICAL FIELD

The present disclosure relates generally to monitoring computing systems, and more specifically to detecting unauthorized activity related to a computer peripheral device based on monitoring voltage of the peripheral device.

BACKGROUND

Automatic Teller Machines (ATMs) are vulnerable to a variety of attacks designed to withdraw money illegitimately. These attacks include direct attacks on the ATM itself such as skimming and black box attacks. Skimming generally includes using a card skimmer attachment in combination with a card Personal Identification Number (PIN) capturing device such as a PIN pad overlay or a camera to collect information which can be used to produce counterfeit cards. In a black box attack, a perpetrator bores holes into the ATM to gain access to its internal infrastructure. The machine's cash dispenser device is then disconnected and attached to an external electronic device, often referred to as a black box, that uses native ATM commands to cause the machine to dispense currency notes. Current approaches to stemming ATM attacks are reactionary after the fact. Existing video surveillance solutions are not very effective at detecting ATM attacks as cameras are generally not integrated with the ATM and are not correlated with the transactions that occur at the ATM. A further disadvantage of these systems is that a high angle of view of the cameras makes their line of sight easy to obstruct.

SUMMARY

The system and methods implemented by the system as disclosed in the present disclosure provide technical solutions to the technical problems faced by current technology by, among other things, detecting unauthorized activities at an ATM including direct attacks such as skimming and black box attacks while the activity is in progress. The disclosed system and methods provide several practical applications and advantages.

A monitoring device is provided that is configured to monitor voltage profiles of peripheral devices connected to the motherboard of the ATM. The peripheral devices may include, but are not limited to, a cash dispenser, a card reader and a keypad. The monitoring device is configured to measure voltages across the terminals of a peripheral device and is configured to detect any voltage irregularities as compared to an expected voltage profile of the device. If a measured voltage of the device does not match the expected voltage profile for the device, the monitoring device determines that an unauthorized change has been made to the peripheral device. For example, when the monitoring device does not detect a voltage drop across a peripheral device, the monitoring device determines that the peripheral device has been disconnected from a respective peripheral port of the motherboard.

Additional mechanisms are provided to detect unauthorized activity with a higher degree of certainty. One additional mechanism may include the monitoring device detecting that the cash dispenser is receiving power from a power supply module when disconnected from the peripheral port. This confirms that the lack of voltage drop is not as a result of the peripheral device not receiving power.

Additional mechanisms are provided to detect black box type attacks with a high degree of certainty. The monitoring device may receive information regarding the operation of the cash dispenser over a direct link between the monitoring device and the cash dispenser. For example, the cash dispenser is configured to report information relating to power consumption by the cash dispenser. Power consumption by the cash dispenser beyond a certain minimal threshold may indicate that the cash dispenser is operating (e.g., dispensing cash) when disconnected from the ATM motherboard (as indicated by lack of voltage drop across the cash dispenser).

In another mechanism, the cash dispenser may be capable of detecting unauthorized commands for dispensing cash. For example, the cash dispenser may be configured to detect a pre-negotiated code with every command for dispensing cash. When the cash dispenser does not receive the code in a command for dispensing cash, the cash dispenser reports the same to the monitoring device over the direct link.

By detecting voltage irregularities in devices that are part of the ATM, the monitoring device can detect any unauthorized changes made to the ATM and its devices quicker than existing approaches to detect ATM attacks. In fact, systems and methods disclosed herein allow detection of any changes made to the ATM as soon as the change is implemented or when an unauthorized device starts operating. Early detection of unauthorized devices such as card skimmers, keypad overlays and cameras allow prompt removal of these unauthorized devices and saves valuable customer data from being stolen. Early detection of black box type of attacks allows an ATM to be locked out before the perpetrator can dispense cash from the ATM.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
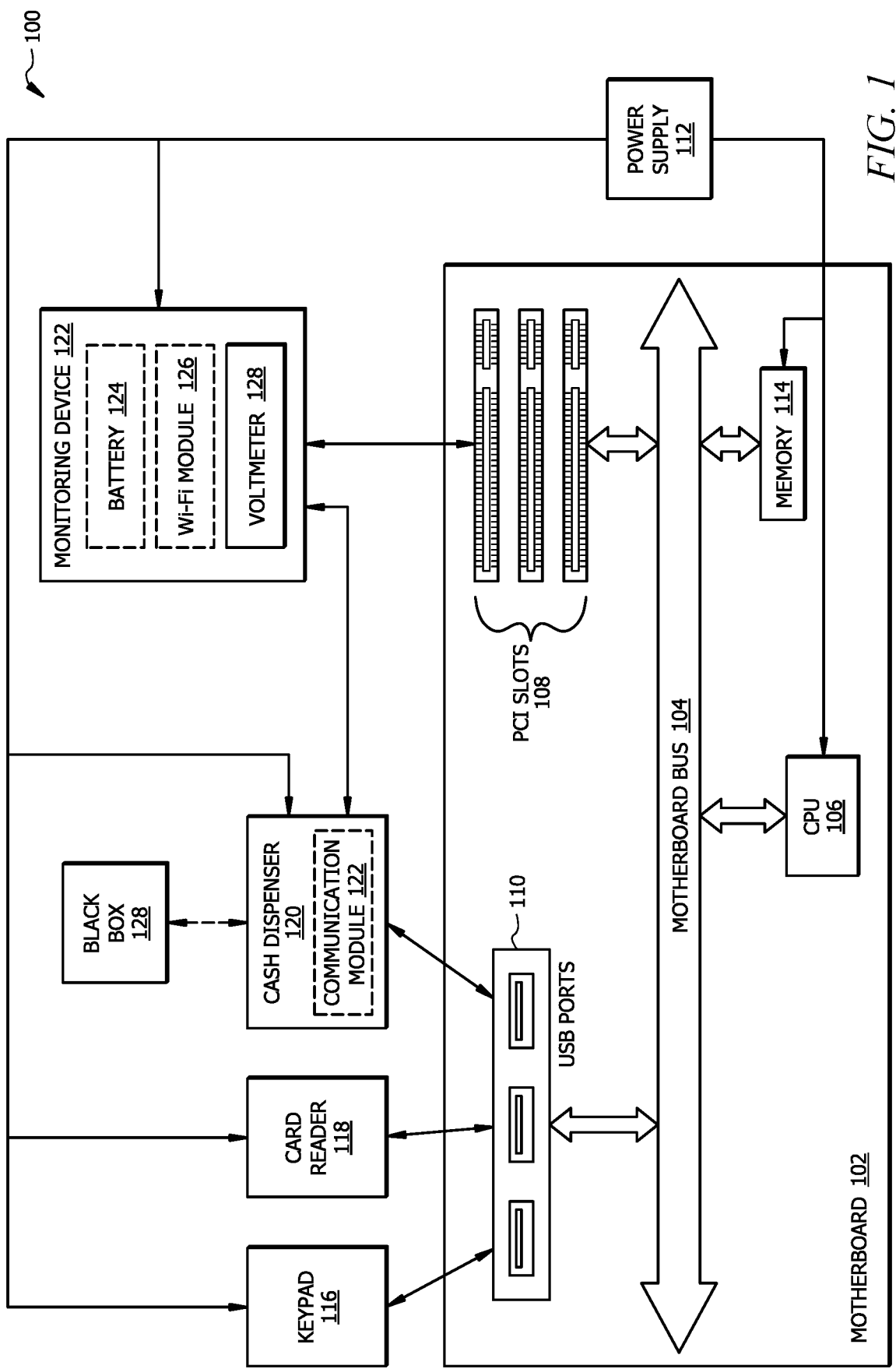
FIG. 1 is a schematic diagram of a system for detecting unauthorized activity related to an ATM, in accordance with certain embodiments of the present disclosure.

FIG. 1 is a schematic diagram of a system 100 for detecting unauthorized activity related to an ATM, in accordance with certain embodiments of the present disclosure.

As shown, system 100 includes a motherboard 102 configured to hold a plurality of electronic components and provide connectors for connecting peripheral devices to the motherboard 102. The motherboard 102 allows communication between the various electronic components and peripheral devices over a motherboard bus 104. The electronic components may include, but are not limited to, a Central Processing Unit (e.g., CPU 106), a memory (e.g., 114), and other subsystems such as a motherboard processor, input/output controller and memory controller. Connectors may include, but are not limited to, one or more Peripheral Connect Interface (PCI) slots (e.g., PCI slots 108), one or more Universal Serial Bus (USB) ports (e.g., USB ports 110), one or more Accelerated Graphics Port (AGP) slots and memory slots. A power supply module 112 is configured to supply power to each of the electronic components on the motherboard 102 and peripheral devices connected to the motherboard 102.

The motherboard may be installed in an ATM to control operations related to the ATM. Peripheral devices needed to perform several operations related to the ATM may be connected to the motherboard 102 using connectors provided on the motherboard 102. As shown, a card reader 118, a keypad 116 and a cash dispenser 120 may be connected to the motherboard 102 using the USB ports 110. The card reader 118 captures account information stored on the magnetic stripe on the back of an ATM/debit or credit card. The keypad 116 generally includes a number of buttons with alphanumeric characters and some additional buttons such as "ENTER", "CLEAR" and "CANCEL" allowing the user to enter a Personal Identification Number associated with an ATM/debit or credit card. The cash dispenser 120 provides a mechanism for safe dispensing of cash. Other peripheral devices that may be connected to the motherboard 102 may include, but are not limited to, a display screen providing a visual interface for communicating with the user, a speaker to provide auditory feedback to the user and a receipt printer to provide the user with a paper receipt of a transaction.

The CPU 106 may be configured to implement various instructions stored in the memory 114. For example, the CPU may include one or more processors configured to execute the instructions to implement the functions of the ATM.

As noted above, ATMs are vulnerable to a variety of attacks designed to withdraw money illegitimately. Direct attacks on an ATM may include, but are not limited to, skimming attacks and black box attacks. These direct attacks may include a perpetrator connecting additional devices to the ATM or disconnecting devices from the ATM. For example, in a skimming attack, a perpetrator may affix a card skimmer attachment to the card reader 118 to read magnetic strips of cards that users slide through the card reader. Keypad overlay devices may be affixed on top of the keypad 116 to record keypad entries as the user types them. Additionally or alternatively discrete cameras pointed at the keypad 116 may be used to visually record the keypad entries. In a black box attack, a perpetrator bores holes into the ATM to gain access to its internal infrastructure. The machine's cash dispenser 120 is then disconnected from the motherboard 102 and attached to an external electronic device, often referred to as a black box, that uses native ATM commands to cause the machine to dispense currency notes, bypassing the need for a card or transaction authorization. As shown in FIG. 1, a black box device 128 may be connected to the cash dispenser 120 to bypass the ATM safeguards in place and withdraw money illegitimately. In this context, a perpetrator may disconnect the USB cable connecting the cash dispenser 120 to a USB port 110 and may connect the cash dispenser 120 to a USB port on the black box device 128.

Generally, a voltage drop occurs across the terminals of an electrical or electronic device when current flows through the device. The voltage drop is caused as a result of a decrease in electrical potential along the path of a current flowing in an electrical or electronic circuit of the device. The drop in voltage occurs due to the resistance offered by the electrical or electronic circuit to the flow of current through the device. Any additional circuits added between the terminals of a device adds additional resistance to the flow of current, resulting in an increased voltage drop. On the other hand, if a device is disconnected from the terminals, no voltage drop occurs.

Generally, most unauthorized devices such as skimmer devices, keypad overlay devices and cameras are connected across the power terminals of an ATM peripheral device they are affixed to such that the devices draw power from the ATM power supply module 112. For example, a card skimmer device may be connected across the power terminals of the card reader 118 and a keypad overlay device may be connected across the power terminals of the keypad 116. As a result, addition of unauthorized devices across the peripheral terminals of the ATM changes the voltage profile of the respective peripheral devices.

Aspects of the present disclosure describe techniques for detecting unauthorized activity associated with an ATM by monitoring a voltage profile of one or more devices of the ATM. Unauthorized activity may include, but is not limited to, adding external devices or electrical/electronic circuits to the motherboard 102 or a peripheral device connected to the motherboard 102, modifying the motherboard 102 or a peripheral device connected to the motherboard 102, disconnecting a peripheral device from the motherboard 102, and unauthorized operation of a peripheral device. As described below, voltage irregularities compared to baseline voltage profiles of peripheral devices may be monitored to detect changes across peripheral terminals of the ATM including addition of an unauthorized peripheral device, changes to an authorized peripheral device, and disconnecting a peripheral device.

As shown in FIG. 1, system 100 includes a monitoring device 122 that is configured to monitor voltage profiles of devices connected to the motherboard 102. As shown, the monitoring device 122 may be implemented as a PCI card that can be inserted into a PCI slot 108 on the motherboard 102. However, it is obvious to a skilled person that the monitoring device 122 may be implemented to connect to other input/output ports of the motherboard 102 or as an integrated device on the motherboard 102. The monitoring device 122 is connected to the motherboard bus 104 and is capable of measuring voltages across devices on the motherboard 102 as well as peripheral devices connected to the motherboard 102. For example, the monitoring device 122 is configured to measure voltages across each of the cash dispenser 120, the card reader 118 and the keypad 116. The monitoring device 122 may include any known voltage measuring device such as a voltmeter or an ohmmeter 128 to measure voltages associated with devices.

In one or more aspects, the monitoring device has access to an expected voltage profile for each of the devices on the motherboard 102 or connected to the motherboard 102. For example, the monitoring device 122 has access to an expected voltage profile of each of the cash dispenser 120, the card reader 118 and the keypad 116. An expected voltage profile for a device may include one or more expected voltage values associated with normal authorized operation of the device. For example, each press of a button on the keypad 116 may be associated with a voltage drop. The voltage profile for the keypad may include voltage values that account for voltage drops associated with individual button presses on the keypad 116 as well as voltage drops associated with pressing a combination of the buttons on the keypad 116. Similarly, voltage profiles for the card reader 118 and the cash dispenser 120 may include voltage values associated with individual operations and combination of operations performed by the respective device. Essentially, the voltage profile of a device includes substantially all possible voltage values that may be detected across the device terminals during authorized operation of the device including operational exceptions such as voltage changes as a result of device overheating, triggering of optional circuits and devices such as a cooling fan, circuit breakers, safety fuses and the like.

Information regarding the expected voltage profiles of devices may be stored in the system memory 114 or a local memory (not shown) integrated on to the monitoring device 122.

The monitoring device 122 is configured to measure voltages across the terminals of each of the peripheral devices including the cash dispenser 120, the card reader 118 and the keypad 116 and is configured to detect any voltage irregularities as compared to the expected voltage profiles of these devices. The monitoring agent 122 may be configured to measure device voltages continuously, periodically or according to a pre-configured schedule. The monitoring device 122 compares each voltage value measured across the terminals of a peripheral device and compares the measured voltage with expected voltage values in the voltage profile of the device. If the measured voltage does not match any of the expected voltage values for the device, the monitoring device 122 may determine that an unauthorized change has been made to the peripheral device. The unauthorized change may include, but is not limited to, addition of an external device or circuitry to the device, modifying the internal circuitry of the device and disconnecting the device from the respective peripheral port (e.g., USB port 110) of the motherboard 102. In one or more aspects, the monitoring device may determine that an unauthorized change has been made to the peripheral device when the measured voltage of the device deviates from the expected voltage profile of the device by a minimum threshold voltage. This keeps false positives from occurring and ensures that minor voltage spikes as a result of power fluctuations are accounted for.

The monitoring device 122 may be configured to build expected voltage profiles for one or more devices on the motherboard 102 or peripheral devices connected to the motherboard 102 including the cash dispenser 120, card reader 118 and keypad 116. In order to build an expected voltage profile for a device, the ATM may be run in a training mode supervised by authorized personnel. While the ATM is running in the supervised training mode, the monitoring device 122 may measure voltage values across the device terminals and record the measured values in the device's expected voltage profile. A set of test operations may be performed at the ATM during the training mode, wherein the set of test operations is designed to comprehensively cover various operations that may be performed during a real-world operation of the ATM. Additionally or alternatively, the ATM may be run in the training mode for a preselected time period during a real-world operation of the ATM to capture voltage profiles of devices when the ATM is being operated by real-world users. The time period may be range from a few hours, days, to several weeks or any other appropriate time period.

In one or more aspects, the monitoring device may be configured to detect certain types of voltage irregularities associated with known unauthorized activities associated with the ATM. For example, the monitoring device 122 may be trained using known unauthorized devices including, but not limited to, known card skimmer devices, known keypad overlay devices and known camera devices. This kind of training may include intentionally connecting a known unauthorized device to an authorized peripheral device or the motherboard 102, so that the monitoring device may measure and record the voltage profile associated with the unauthorized device. This allows, the monitoring device 122 to readily identify known unauthorized devices when such devices are used to carry out unauthorized activities at the ATM.

The monitoring device 122 may be configured to perform one or more actions in response to detecting that an unauthorized activity has occurred at the ATM. The actions may include, but are not limited to, transmitting a signal to the CPU 106 that triggers the CPU 106 to cease all ATM operations, trigger an audible alarm at the ATM, send out a signal that locks exit doors and prevents the perpetrators from escaping and send out a signal to security and/or law enforcement authorities.

In the context of black box attacks, as described above, a perpetrator disconnects a USB cable connecting the cash dispenser 120 to a USB port 110 and connects the cash dispenser 120 to a USB port on the black box device 128. The perpetrator then issues commands from the black box 128 directly to the cash dispenser 120 to dispense cash. When the cash dispenser 120 is disconnected from the USB port 110 of the motherboard 102, the monitoring device 122 measures no voltage drop at the USB port 110 indicating that the cash dispenser 120 has been disconnected. The monitoring module may be configured to determine that an unauthorized activity has occurred at the ATM in response to detecting that that the cash dispenser 120 has been disconnected from the motherboard 102.

In some cases, the lack of voltage drop at the USB port 110 may not necessarily be as a result of unauthorized unplugging of the cash dispenser. For example, the lack of voltage drop may occur as a result of other reasons including, but not limited to, a failed USB cable and electrical issues at the motherboard 102 or at the cash dispenser 120 including loss of power. Additional mechanisms may be implemented by the monitoring device 122 in order to determine with more certainty that an unauthorized activity has occurred at the ATM in response. For example, one additional mechanism may include detecting that the cash dispenser is most likely receiving power from the power supply module 112. For example, when the monitoring device 122 is receiving power from the power supply module 112, this indicates that the power supply module 112 has not failed and there is a high likelihood that the cash dispenser 120 is also receiving power. Thus, when the monitoring device 122 detects no voltage drop across the USB port that connects the cash dispenser 120, and additionally detects that the monitoring device 122 is receiving power from the power supply module 112, the monitoring device 122 determines that an unauthorized activity (e.g., unauthorized disconnecting of the cash dispenser 120) has occurred with regard to the cash dispenser 120. Thus, a combination of detecting a lack of voltage drop across the USB port 110 and detecting a likelihood of power supply to the cash dispenser 120 provides a higher certainty that unauthorized activity has occurred.

Other mechanisms may be implemented to help the monitoring device 122 in determining that an unauthorized activity has occurred at the ATM with still greater degree of certainty as compared to mechanisms discussed above. For example, the monitoring device 122 may receive information regarding the operation of the cash dispenser 120 over a direct link 130 between the monitoring device 122 and the cash dispenser 120. The direct link 130 may include a cable directly connecting the monitoring device 122 and the cash dispenser 120. A communication module 122 may be implemented at the cash dispenser 120 that collects information regarding the cash dispenser 120 and transmits the information over the cable 130 to the monitoring device 122.

The information transmitted by the cash dispenser 120 may include, but is not limited to, information relating to power consumption by the cash dispenser, commands received by the cash dispenser 120 to dispense cash and other operational information about the cash dispenser 120. For example, the cash dispenser 120 may be configured to report information relating to power consumption by the cash dispenser 120. Information relating to power consumption may include, but is not limited to, an amount of current being drawn by the cash dispenser 120, voltage readings across the cash dispenser or a combination thereof. Power consumption beyond a certain minimal threshold may indicate that the cash dispenser 120 is operating (e.g., dispensing cash). Thus, when the monitoring device 122 detects no voltage drop across the USB port that connects the cash dispenser 120, and additionally receives information from the cash dispenser 120 over the cable 130 that the cash dispenser is consuming power over a predefined threshold power, the monitoring device 122 knows that the cash dispenser is operating when disconnected from the motherboard 102, and in response, may determine with a high degree of certainty that an unauthorized activity (e.g., a black box attach) has occurred with regard to the cash dispenser 120.

Another mechanism to detect a black box type attack with a high degree of certainty may include transmitting a secret code to the cash dispenser 120 with each command for dispensing cash. For example, during normal authorized transactions, the CPU may include a secret code in every command that it sends to the cash dispenser 120 for dispensing cash. The secret code may be previously negotiated and agreed to by the CPU and the cash dispenser. The secret code indicates to the cash dispenser 120 that a command received for dispensing cash is for an authorized transaction. Absence of the pre-negotiated code or receiving a different code in a command for dispensing cash indicates to the cash dispenser 120 that the command is not for an authorized transaction.

The cash dispenser 120 may be configured to send out an alert to the monitoring device over the cable 130 when the cash dispenser does not detect the pre-negotiated code or detects a code different from the pre-negotiated code in a command it receives for dispensing cash. The alert indicates to the monitoring device 122 that the cash dispenser 120 has received an unauthorized command to dispense cash. The system 100 may be configured to negotiate a new secret code in accordance with a pre-selected schedule or randomly so that integrity of the secret code may be maintained.

Another mechanism to detect a black box type attach with a high degree of certainty may include the cash dispenser 120 transmitting an acknowledgement signal to the monitoring device 122 over the cable 130 in response to receiving each command for dispensing cash from the CPU. This means the cash dispenser 120 transmits the acknowledgement signal also in response to receiving commands to dispense cash from a black box device 128. The monitoring device 122 may be capable of tracking commands to dispense cash transmitted by the CPU 106. Thus, when the monitoring device 122 receives an acknowledgement signal from the cash dispenser 120 that is not in response to a command transmitted by the CPU 106, the monitoring device 122 determines that the cash dispenser 120 received an unauthorized command to dispense cash.

The monitoring device may be configured to send out a command to the cash dispenser 120 over the cable 130 to cease all operation, in response to detecting that an unauthorized activity has occurred. For example, the monitoring device 122 may be configured to send out the command to the cash dispenser 120 in response to detecting a lack of voltage drop across the USB port 110, detecting a lack of voltage in combination with detecting the monitoring device is receiving power from the power supply 112, detecting a lack of voltage drop in combination with receiving information over the cable 130 that the cash dispenser is using power over a threshold, receiving an alert over the cable 130 that the cash dispenser 120 did not receive the pre-negotiated code with a command for dispensing cash, receiving an acknowledgement signal from the cash dispenser 120 that is not in response to transmitting a command from the CPU 106 or a combination thereof.

The monitoring device 122 may optionally include a Wi-Fi module 126 that may connect to a Wi-Fi network. The Wi-Fi module 126 allows the monitoring device 122 to wirelessly transmit an alert and/or information relating to an ATM attack to concerned authorities such as security personnel and/or law enforcement.

The monitoring device 122 optionally includes a battery 124 that can provide power to the monitoring device 122 when not receiving power from the power supply module 112. This allows the monitoring device 122 to continue operating even when a perpetrator interrupts power supply to the monitoring device 122, for example, by cutting power to the ATM or cutting power from the power supply module 112.

Figure 2:
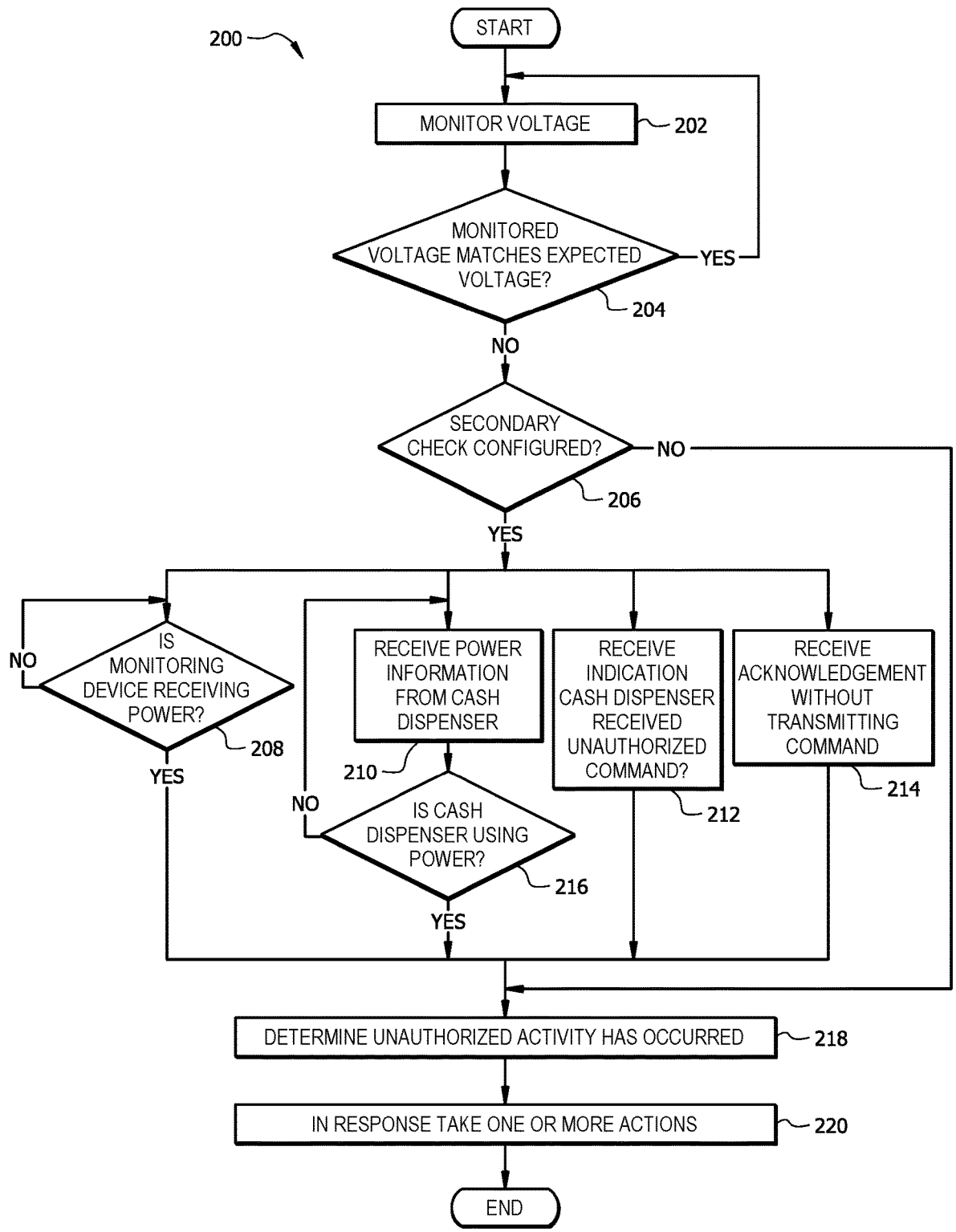
FIG. 2 illustrates a flowchart of an example method for detecting unauthorized activity at an ATM, in accordance with certain embodiments of the present disclosure.

FIG. 2 illustrates a flowchart of an example method 200 for detecting unauthorized activity at an ATM, in accordance with certain embodiments of the present disclosure. The method 200 may be performed by the monitoring device 122 shown in FIG. 1.

Example method 200 begins at step 202, where the monitoring device 122 monitors a voltage associated with a peripheral device such as a cash dispenser 120, a card reader 118 and/or a keypad 116. The peripheral device may plugged into a peripheral port of a motherboard 102. For example, a peripheral device may be plugged into a USB port 110 of the motherboard 102. As described above, the motherboard 102 is configured to hold a plurality of electronic devices and further provide connectors for connecting one or more peripheral devices to the motherboard 102. Communication among the electronic devices and peripheral components of the motherboard may be facilitated by a motherboard bus 104. The monitoring device 122 may be implemented as a PCI card that can be inserted into a PCI slot 108 of the motherboard 102. Thus, monitoring device 122 is connected to the motherboard bus 104 and is capable of measuring voltages across devices on the motherboard 102 as well as peripheral devices connected to the motherboard 102. For example, the monitoring device 122 is configured to measure voltages across each of the cash dispenser 120, the card reader 118 and the keypad 116. The monitoring device 122 may include any known voltage measuring device such as a voltmeter or an ohmmeter 128 to measure voltages associated with devices.

At step 204, the monitoring device checks if the monitored voltage across a peripheral device matches an expected voltage profile of the peripheral device. The monitoring device has access to an expected voltage profile for each of the devices on the motherboard 102 or peripheral devices connected to the motherboard 102. For example, the monitoring device 122 has access to an expected voltage profile of each of the cash dispenser 120, the card reader 118 and the keypad 116. An expected voltage profile for a device may include one or more expected voltage values associated with normal authorized operation of the device. The monitoring device 122 is configured to measure voltages across the terminals of each of the peripheral devices including the cash dispenser 120, the card reader 118 and the keypad 116 and is configured to detect any voltage irregularities as compared to the respective expected voltage profiles of these devices. The monitoring device 122 compares each voltage value measured across the terminals of a peripheral device and compares the measured voltage with expected voltage values in the voltage profile of the device. If the monitored voltage of a peripheral device matches with the expected voltage profile of the device, the method 200 proceeds back to step 202 where the monitoring device 122 continues to monitor the voltage across the peripheral device.

On the other hand, if the monitored voltage of the peripheral device fails to match the expected voltage profile of the peripheral device, the method 200 proceeds to step 206.

At step 206, the monitoring device 122 checks whether a secondary check has been configured to determine that unauthorized activity associated with the ATM has occurred. If a secondary check is not configured, the monitoring device 122 determines that an unauthorized activity associated with the ATM has occurred. Unauthorized activity may include, but is not limited to, adding external devices or electrical/electronic circuits to the motherboard 102 or a peripheral device connected to the motherboard 102, modifying the motherboard 102 or a peripheral device connected to the motherboard 102, disconnecting a peripheral device from the motherboard 102 and unauthorized operation of a peripheral device.

For example, if the measured voltage of a peripheral device does not match any of the expected voltage values for the device, the monitoring device 122 may determine that an unauthorized change has been made to the peripheral device. The unauthorized change may include, but is not limited to, addition of an external device or circuitry to the device, modifying the internal circuitry of the device and disconnecting the device from the respective peripheral port (e.g., USB port 110) of the motherboard 102. In one or more aspects, the monitoring device may determine that the measured voltage fails to match the expected voltage of the device when the measured voltage of the device deviates from the expected voltage profile of the device by a minimum threshold voltage. This keeps false positives from occurring and ensures that minor voltage spikes as a result of power fluctuations are accounted for. Detecting a lack in voltage drop across a peripheral port where a peripheral device is normally connected is also considered not matching expected voltage profile of the peripheral device. As described above, a lack of voltage drop across a peripheral port indicates that the peripheral device is disconnected from the peripheral port.

At step 206, if a secondary check is configured, method may proceed to any one or more of the steps 208, 210, 212 and 214. In other words, operations of any one or more of the steps 208, 210, 212 and 214 may be configured as secondary check(s) to determine with a higher degree of certainty whether an unauthorized activity related to the ATM has occurred. For example, the lack of voltage drop at the USB port 110 may not necessarily be as a result of unauthorized unplugging of the peripheral device. In some cases, the lack of voltage drop may occur as a result of other reasons including, but not limited to, a failed USB cable and electrical issues at the motherboard 102 or at the peripheral device including loss of power. Additional mechanisms (e.g., secondary checks of steps 208, 210, 212 and 214) may be implemented by the monitoring device 122 in order to determine with more certainty that an unauthorized activity has occurred at the ATM in response.

It may be noted that while the secondary check in step 208 applies to any peripheral device, the secondary checks of steps 210, 212 and 214 may apply only to a cash dispenser 120 where the dispenser 120 is directly connected to the monitoring device 122 with a cable 130.

At step 208, the monitoring device 122 checks whether the monitoring device continues to receive power from a power supply of the ATM (e.g., power supply module 112). For example, when the monitoring device 122 is receiving power from the power supply module 112, this indicates that the power supply module 112 has not failed and there is a high likelihood that the peripheral device such as the cash dispenser 120 is also receiving power. Thus, when the monitoring device 122 detects (at step 204) no voltage drop across the USB port that connects the peripheral device, and additionally detects (at step 208) that the monitoring device 122 is receiving power from the power supply module 112, the monitoring device 122 determines (at process block 218) that an unauthorized activity (e.g., unauthorized disconnecting of the peripheral device) has occurred with regard to the peripheral device. Thus, a combination of detecting a lack of voltage drop across the USB port 110 and detecting a likelihood of power supply to the peripheral device provides a higher certainty that unauthorized activity has occurred.

Other mechanisms may be implemented to help the monitoring device 122 in determining that an unauthorized activity has occurred at the ATM with still greater degree of certainty as compared to mechanisms discussed above. For example, the monitoring device 122 may receive information regarding the operation of the cash dispenser 120 over a direct link 130 between the monitoring device 122 and the cash dispenser 120. The direct link 130 may include a cable directly connecting the monitoring device 122 and the cash dispenser 120. A communication module 122 may be implemented at the cash dispenser 120 that collects information regarding the cash dispenser 120 and transmits the information over the cable 130 to the monitoring device 122.

The information transmitted by the cash dispenser 120 may include, but is not limited to, information relating to power consumption by the cash dispenser, commands received by the cash dispenser 120 to dispense cash and other operational information about the cash dispenser 120.

For example, at step 210, the monitoring device may receive information relating to power consumption by the cash dispenser 120 over the cable 130. Information relating to power consumption may include, but is not limited to, an amount of current being drawn by the cash dispenser 120, voltage readings across the cash dispenser or a combination thereof. Power consumption beyond a certain minimal threshold may indicate that the cash dispenser 120 is operating (e.g., dispensing cash). At step 216, the monitoring device checks based on the received power information whether the cash dispenser 120 is using power (e.g., beyond a minimum threshold). When the monitoring device 122 detects (at step 204) no voltage drop across the USB port that connects the cash dispenser 120, and additionally determines (at step 216) that the cash dispenser is consuming power over a predefined threshold power, the monitoring device 122 knows that the cash dispenser is operating when disconnected from the motherboard 102, and in response, may determine (at process block 218) with a higher degree of certainty that an unauthorized activity (e.g., a black box attach) has occurred with regard to the cash dispenser 120.

Another mechanism to detect a black box type attack with a higher degree of certainty may include transmitting a secret code to the cash dispenser 120 with each command for dispensing cash. For example, during normal authorized transactions, the CPU may include a secret code in every command that it sends to the cash dispenser 120 for dispensing cash. The secret code may be previously negotiated and agreed to by the CPU and the cash dispenser. The secret code indicates to the cash dispenser 120 that a command received for dispensing cash is for an authorized transaction. Absence of the pre-negotiated code or receiving a different code in a command for dispensing cash indicates to the cash dispenser 120 that the command is not for an authorized transaction. The cash dispenser 120 may be configured to send out an alert to the monitoring device over the cable 130 when the cash dispenser does not detect the pre-negotiated code or detects a code different from the pre-negotiated code in a command it receives for dispensing cash.

For example, at step 212, the monitoring device 122 receives an indication from the cash dispenser 120 over the cable 130 that the cash dispenser 120 has received a command to dispense cash that does not have the secret pre-negotiated code or has a code different from the pre-negotiated code. This indicates to the monitoring device 122 that the cash dispenser 120 has received an unauthorized command to dispense cash. In response to receiving the indication, the monitoring device determines (at process block 218) that an unauthorized activity related to the ATM has occurred. In this context the unauthorized activity is the cash dispenser 120 receiving an unauthorized command to dispense cash. The system 100 may be configured to negotiate a new secret code in accordance with a pre-selected schedule or randomly so that integrity of the secret code may be maintained.

Another mechanism to detect a black box type attack with a high degree of certainty may include the cash dispenser 120 transmitting an acknowledgement signal to the monitoring device 122 over the cable 130 in response to receiving each command for dispensing cash from the CPU. This means the cash dispenser 120 transmits the acknowledgement signal also in response to receiving commands to dispense cash from a black box device 128. The monitoring device 122 may be capable of tracking commands to dispense cash transmitted by the CPU 106. Thus, when the monitoring device 122 receives an acknowledgement signal from the cash dispenser 120 that is not in response to a command transmitted by the CPU 106, the monitoring device 122 determines that the cash dispenser 120 received an unauthorized command to dispense cash. For example, at step 214, the monitoring device 122 receives an acknowledgement from the cash dispenser 120 over the cable 130, wherein the acknowledgement is not in response to a command transmitted by the CPU 106. In response, the monitoring device 122 determines (at process block 218) that an unauthorized activity related to the ATM has occurred. In this context the unauthorized activity is the cash dispenser 120 receiving an unauthorized command to dispense cash.

At step 220, the monitoring device 122 may perform one or more actions in response to detecting that an unauthorized activity related to the ATM has occurred. For example, the monitoring device may be configured to send out a command to one or more peripheral devices to cease all operations. For example, the monitoring device 122 may send out a command to the cash dispenser 120 over the cable 130 to cease all operations, in response to detecting that an unauthorized activity has occurred. Additionally or alternatively the monitoring device 122 may send out an alert and/or information relating to an ATM attack to concerned authorities such as security personnel and/or law enforcement.

Figure 3:
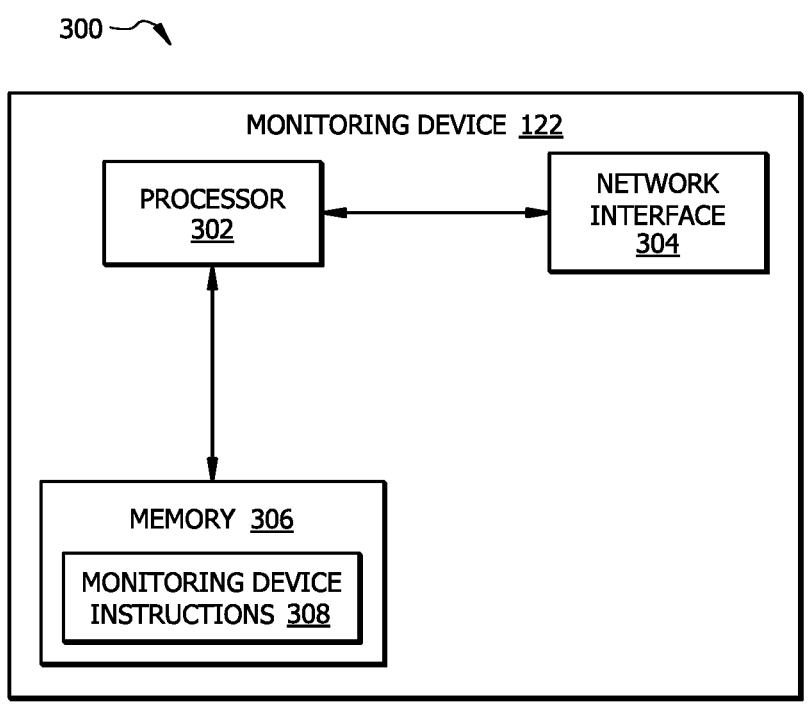
FIG. 3 illustrates an example schematic diagram of the monitoring device, in accordance with one or more embodiments of the present disclosure.

FIG. 3 illustrates an example schematic diagram of the monitoring device 122, in accordance with one or more embodiments of the present disclosure.

The monitoring device 122 comprises a processor 302, a memory 306, and a network interface 304. The monitoring device 122 may be configured as shown in FIG. 3 or in any other suitable configuration. The monitoring device 122 may optionally include a battery 124 and a voltmeter as shown in FIG. 1.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (monitoring device instructions 308) to implement the monitoring device 122. In this way, processor 302 may be a special-purpose computer designed to implement the functions disclosed herein of the monitoring device 122. In one or more embodiments, the monitoring device 122 is implemented using logic units, FPGAs, ASICs, DSPs, or any other suitable hardware. The monitoring device 122 is configured to operate as described with reference to FIGS. 1-2. For example, the monitoring device 122 may be configured to perform at least a portion of the flowchart 200 as described in FIG. 2, respectively.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store the monitoring device instruction 308 and/or any other data or instructions. The monitoring device instruction 308 may include any suitable set of instructions, logic, rules, or code operable to execute operations of the monitoring device 122.

The network interface 304 is configured to enable wired and/or wireless communications. The network interface 304 is configured to communicate data between the monitoring device 122 and other devices (e.g. the cash dispenser 120), systems, or domains. For example, the network interface 304 may comprise a Wi-Fi interface, a LAN interface, a WAN interface, a modem, a switch, or a router. In one aspect, the network interface 304 includes the Wi-Fi module 126 of the monitoring device 122. The processor 302 is configured to send and receive data using the network interface 304. The network interface 304 may be configured to use any suitable type of communication protocol as would be appreciated by one of ordinary skill in the art.

It may be noted that one or more other components shown in FIG. 1 may be implemented by a hardware device having a similar structure to the monitoring device 122 shown in FIG. 3. For example, each of the cash dispenser 120, card reader 118 and keypad 116 may have a similar structure shown in FIG. 3. For example, each of these devices may include a network interface to communicate with other devices within the network 150 and a processor operatively coupled to a memory storing instructions which when executed by the processor implement a functionality of the device as described with reference to FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a motherboard configured to hold electronic devices and allow communication between one or more of the electronic devices;
a power supply module configured to supply power to the one or more electronic devices;
a peripheral device communicatively coupled to the motherboard using a peripheral port of the motherboard to perform at least one action related to an Automated Teller Machine (ATM); and
a monitoring device communicatively coupled to the motherboard and configured to:
monitor a voltage associated with the peripheral device;
detect that the monitored voltage does not match an expected voltage associated with the peripheral device, wherein the detecting comprises detecting there is no voltage drop across the peripheral device; and
determine, in response to the detecting, that an unauthorized activity associated with the peripheral device has occurred, wherein the determining comprises determining, based on detecting there is no voltage drop across the peripheral device, that the peripheral device is disconnected from the motherboard.

2. The system of claim 1, wherein the monitoring device is further configured to:
detect that the monitoring device is receiving power from the power supply module; and
in response to detecting that the peripheral device is disconnected and that the monitoring device is receiving power, determine that the unauthorized activity associated with the peripheral device has occurred.

3. The system of claim 1, further comprising a communication cable directly connecting the monitoring device and the peripheral device, wherein the monitoring device is further configured to exchange data with the peripheral device via the communication cable.

4. The system of claim 3, wherein the monitoring device is further configured to:
receive information from the peripheral device via the communication cable, wherein the information reports changes in the voltage associated with the peripheral device; and
in response, determine that the unauthorized activity associated with the peripheral device has occurred.

5. The system of claim 3, wherein:
the peripheral device is configured to:
receive one or more commands to perform the at least one action related to the ATM;
detect that the one or more commands does not include a selected code, wherein the selected code indicates that the one or more commands are authorized commands; and
in response to the detecting that the one or more commands does not include the selected code, send an indication via the communication cable to the monitoring device that the unauthorized activity associated with the peripheral device has occurred; and
the monitoring device, in response to receiving the indication from the peripheral device is configured to determine that the unauthorized activity associated with the peripheral device has occurred.

6. The system of claim 3, wherein the monitoring device is further configured to transmit a command to the peripheral device via the communication cable to cease operation of the peripheral device, in response to determining the unauthorized activity.

7. The system of claim 1, wherein the monitoring device is further configured to:
determine that a difference between the monitored voltage and the expected voltage equals or exceeds a selected threshold voltage difference; and
in response determine that the monitored voltage does not match the expected voltage.

8. The system of claim 1, wherein:
the peripheral device includes a cash dispenser of the ATM; and the at least one action relates to dispensing cash from the cash dispenser.

9. The system of claim 1, wherein the peripheral device may comprise one or more of a cash dispenser, an encrypting pin pad or a card reader.

10. The system of claim 1, wherein the peripheral port comprises a Universal Serial Bus (USB) port of the motherboard.

11. The system of claim 1, wherein the monitoring device plugs into a Peripheral Component Interconnect (PCI) slot of the motherboard.

12. A method for detecting unauthorized activity associated with a peripheral device, comprising:
monitoring at a motherboard bus of a motherboard a voltage associated with the peripheral device, wherein the peripheral device is communicatively coupled to the motherboard bus of the motherboard using a peripheral port of the motherboard to perform at least one action related to an Automated Teller Machine (ATM);
detecting that the monitored voltage does not match an expected voltage associated with the peripheral device, wherein the detecting comprises detecting there is no voltage drop across the peripheral device; and
determining, in response to the detecting, that an unauthorized activity associated with the peripheral device has occurred, wherein the determining comprises determining, based on detecting there is no voltage drop across the peripheral device, that the peripheral device is disconnected from the motherboard.

13. The method of claim 12, further comprising:
receiving information from the peripheral device via a communication cable, wherein the information reports changes in the voltage associated with the peripheral device; and
in response, determining that the unauthorized activity associated with the peripheral device has occurred.

14. The method of claim 12, further comprising receiving an indication from the peripheral device via a communications cable that the peripheral device received one or more commands to perform the at least one action related to the ATM and that the one or more commands did not include a selected code, wherein the selected code indicates that the one or more commands are authorized commands.

15. A non-transitory computer-readable medium for storing instructions which when executed by a processor causes the processor to perform a method for detecting unauthorized activity associated with a peripheral device, the method comprising:
monitoring at a motherboard bus of a motherboard a voltage associated with the peripheral device, wherein the peripheral device is communicatively coupled to the motherboard bus of the motherboard using a peripheral port of the motherboard to perform at least one action related to an Automated Teller Machine (ATM);
detecting that the monitored voltage does not match an expected voltage associated with the peripheral device, wherein the detecting comprises detecting there is no voltage drop across the peripheral device; and
determining, in response to the detecting, that an unauthorized activity associated with the peripheral device has occurred, wherein the determining comprises determining, based on detecting there is no voltage drop across the peripheral device, that the peripheral device is disconnected from the motherboard.

16. The non-transitory computer-readable medium of claim 15, further comprising instructions for:
receiving information from the peripheral device via a communication cable, wherein the information reports changes in the voltage associated with the peripheral device; and
in response, determining that the unauthorized activity associated with the peripheral device has occurred.

17. The non-transitory computer-readable medium of claim 15, further comprising instructions for receiving an indication from the peripheral device via a communications cable that the peripheral device received one or more commands to perform the at least one action related to the ATM and that the one or more commands did not include a selected code, wherein the selected code indicates that the one or more commands are authorized commands.

* * * * *